E. CLINTON.
Manufacture of Brushes.
No. 149,992.     Patented April 21, 1874.
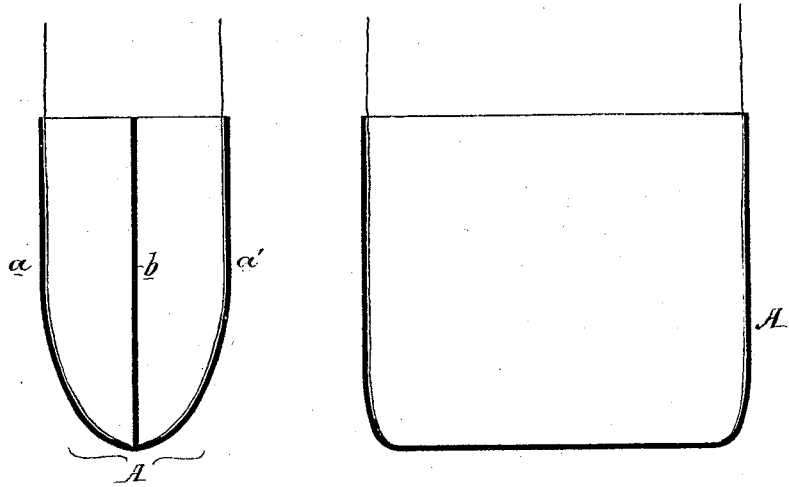
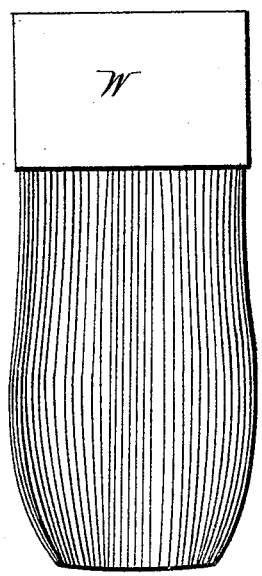
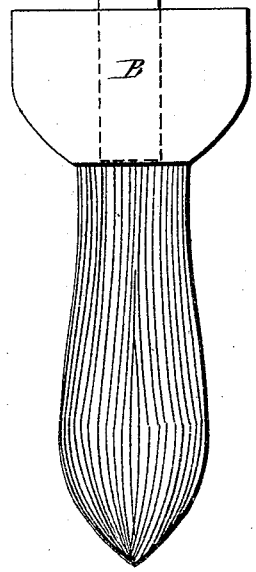
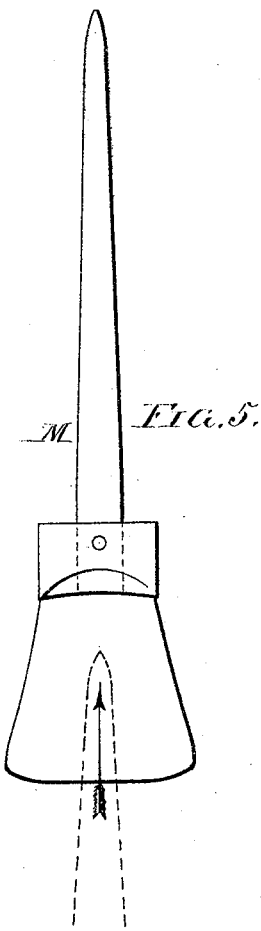
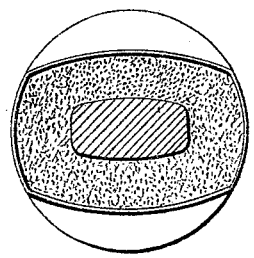
Witnesses,
Harry Smith
Thomas McIlvain
E. Clinton
by his Att'ys
Howson and Son.

UNITED STATES PATENT OFFICE.

EDWIN CLINTON, OF PHILADELPHIA, PENNSYLVANIA.

IMPROVEMENT IN THE MANUFACTURE OF BRUSHES.

Specification forming part of Letters Patent No. 149,992, dated April 21, 1874; application filed February 27, 1873.

*To all whom it may concern:*

Be it known that I, EDWIN CLINTON, of the city and county of Philadelphia, Pennsylvania, have invented an Improvement in the Manufacture of Brushes, of which the following is a specification:

The object of my invention is to produce a brush with bristles arranged in such a uniform mass as to render it especially applicable for varnishing purposes; and this object I attain by the preliminary sorting of the bristles in the casing A, (illustrated in Figures 1 and 2 of the accompanying drawing,) and by confining the same to a ferrule, B, compressed to such a shape in respect to the handle D, which passes through the mass of bristles, that the desired result may be attained. (See Figs. 3, 4, and 5.) The case for sorting the bristles consists of thin metal or other suitable material, and is separated into two compartments by a partition, $b$, as shown in the vertical section, Fig. 1, the opposite sides $a$ $a'$ of the case being curved inward toward the partition, as represented, and the ends being slightly curved at the bottom, as shown in the longitudinal section, Fig. 2.

Bristles of a superior quality are placed, with their fine ends downward, in the two compartments of the case, and, as every bristle is more or less bent, it is arranged with its rounded side opposite the concave side of the case—an arrangement by which increased elasticity is imparted to the brush. The curved sides of the case cause the mass of bristles to assume, at the point of the brush, the desired taper. (Represented in Fig. 3.) The two compartments of the case having been thus filled with bristles, they are withdrawn in a mass, and without changing their relative position, and this mass is passed through the circular ferrule W, Fig. 6, after which the thin end of the tapering handle M is inserted in the direction of the arrows, as shown by dotted lines in Fig. 5, into the mass of bristles, and the handle driven through the same, until its thick end occupies the position shown in Fig. 3, the mass of bristles being thus secured in the ferrule.

The sectional shape of that portion of the handle which is embedded in the mass of bristles is illustrated in Fig. 4, and this shape plays an important part in the final distribution of the bristles into a compact mass of the desired shape, for opposite sides of the lower edge of the ferrule are compressed, as shown in Fig. 3, so that the ferrule at the said lower edge assumes the form illustrated in Fig. 4, which is in accordance with the sectional form of the thick portion of the handle, the bristles being confined between the two in such a manner that those which project beyond the ferrule assume a compact mass of the flat tapering form represented in the drawing—a form which renders the brush especially appropriate for varnishing purposes.

I claim as my invention—

1. The mode, substantially as herein described, of manufacturing brushes—that is, depositing the bristles in separate receptacles, by which each bristle is caused to assume a position with its end curved toward the center of the mass, withdrawing them while thus arranged and securing them to the handle, as specified.

2. A brush in which the bristles on opposite sides are arranged as described, so as to bend toward the center, as set forth.

3. A brush in which the upper ends of the bristles are confined between the lower end of the handle and a ferrule having a mouth coinciding in shape with the handle, as specified.

In testimony whereof I have signed my name to this specification in the presence of two subscribing witnesses.

EDWIN CLINTON.

Witnesses:
WM. A. STEEL,
HUBERT HOWSON.